United States Patent
Doyle et al.

(10) Patent No.: US 6,898,526 B2
(45) Date of Patent: May 24, 2005

(54) METHOD AND APPARATUS FOR ENHANCED SAFETY IN HUNTING ENVIRONMENTS

(75) Inventors: Ronald P. Doyle, Raleigh, NC (US); Marcia L. Peters, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 09/885,779

(22) Filed: Jun. 20, 2001

(65) Prior Publication Data

US 2002/0198659 A1 Dec. 26, 2002

(51) Int. Cl.⁷ ............................. G01S 5/02; G08G 1/16; G08B 25/10
(52) U.S. Cl. ................. 701/300; 701/213; 340/539
(58) Field of Search .................... 701/213, 212, 701/300; 340/573.1, 539, 332, 825.49, 825.69, 825.72, 10.1, 3.31, 825.36, 5.61; 348/135, 158, 143; 342/357.01, 357.07, 357.06, 357.13

(56) References Cited

U.S. PATENT DOCUMENTS

| | | | |
|---|---|---|---|
| 5,045,839 A | * 9/1991 | Ellis et al. | 340/539 |
| 5,068,654 A | * 11/1991 | Husher | 455/502 |
| 5,497,339 A | 3/1996 | Bernard | 364/705.05 |
| 5,629,678 A | 5/1997 | Gargano et al. | 340/573 |
| 5,731,757 A | * 3/1998 | Layson, Jr. | 340/573 |
| 5,754,125 A | * 5/1998 | Pearce | 340/989 |
| 5,864,481 A | 1/1999 | Gross et al. | 364/400 |
| 6,043,777 A | 3/2000 | Berfman et al. | 342/357.09 |
| 6,185,504 B1 | 2/2001 | Berstis et al. | 701/213 |
| 6,198,394 B1 | * 3/2001 | Jacobsen et al. | 340/573.1 |
| 6,198,431 B1 | 3/2001 | Gibson | 342/357.07 |
| 6,246,376 B1 | * 6/2001 | Bork et al. | 343/760 |
| 6,268,798 B1 | * 7/2001 | Dymek et al. | 340/573.1 |
| 6,298,306 B1 | * 10/2001 | Suarez et al. | 701/213 |
| 6,377,179 B1 | * 4/2002 | Fulton | 340/573.1 |

* cited by examiner

Primary Examiner—Thomas G. Black
Assistant Examiner—Dalena Tran
(74) Attorney, Agent, or Firm—Synnestvedt & Lechner LLP; Jerry W. Herndon

(57) ABSTRACT

The invention is a system combining a Global Positioning Satellite (GPS) receiver, an electronic compass and a two-way wireless communication system wherein a plurality of hunters each carry such a device. The device is adapted to determine its location using GPS, report that location to a base station or directly to other such devices, receive the location of the other hunters from the base station or directly from other of such devices, and to warn the hunter when aiming his weapon in the direction of another hunter that is within an unsafe distance.

22 Claims, 2 Drawing Sheets

METHOD AND APPARATUS FOR ENHANCED SAFETY IN HUNTING ENVIRONMENTS

FIELD OF THE INVENTION

The invention pertains to Global Positioning Systems (GPS) and two-way wireless communication networks. More particularly, the invention pertains to the use of GPS and wireless two-way communication systems to enhance safety among a group of outdoor recreationists.

BACKGROUND OF THE INVENTION

The Global Positioning Satellite (GPS) system is a global satellite based system maintained and operated by the United States government by which a GPS receiver can receive transmissions from the satellites and determine its position on earth with a high degree of accuracy. As a result of a recent lifting of restrictions on the positioning resolution of the system, an individual carrying a GPS receiver can now pinpoint his or her position on the earth within approximately a 20 to 25 foot radius.

In operation, a GPS receiver receives transmissions from two or more of the geo-stationary GPS satellites and, through the use of triangulation, can determine the position of the receiver relative to the satellites. More particularly, each satellite transmits a signal that includes information as to what particular satellite is transmitting the signal and the timing of the signal. A GPS receiver receiving signals from two or more satellites can determine the length of time each signal took to reach the receiver for each satellite and, by the running a mathematical triangulation algorithm on the received data, pinpoint the location of the receiver relative to the satellites. Original GPS systems were relatively bulky and thus typically vehicle mounted. They were originally used in military applications, such as aircraft and missiles. They have since become common for use in navigation systems in automobiles. Eventually, the electronics of the receivers became inexpensive and small enough that there are now many commercially available palm-top GPS receivers. Typically a user of a GPS system must manually input his elevation relative to mean sea level in order for the device to work most accurately.

Wireless two-way communication systems have also been in wide use for many years. Two-way short-wave radios such as walkie-talkies have been in use among the military and civilian population for many decades and provide reasonable two way communications between two transceivers within a relatively short distance of each other. Depending on the sophistication, size and power of the unit, and the local terrain, walkie-talkies typically have a range of approximately one-quarter mile to ten miles. Cellular telephone systems are another form of personal, wireless, two-way communication system. As is well known to those of skill in the art, an individual carrying a cellular transceiver (e.g., a cell phone) can transmit and receive data from a stationary base station within a certain distance of his or her location (typically no more than five miles). The base station comprises a wireless transceiver capable of supporting many channels simultaneously and also is coupled to convert and switch signals in both directions between the wireless communication system and the wired telephone network. Thus, when someone makes a cellular telephone call, that individual carries on a two-way wireless communications session between the hand held cellular telephone and the base station. The base station carries on a two-way wire-based communication of the same content with the other termination point of the communication link. Of course, if the other termination point is another cellular telephone, then, at the opposite end, the signals transmitted and received via the wired telephone network are sent to another cellular base station and further transmitted and received over another wireless connection between another cellular telephone and that base station.

Systems have been devised for integrating a GPS system and a one-way communication system to provide various services to individuals and businesses. For instance, U.S. Pat. No. 6,185,504 discloses a vehicle scheduling and collision avoidance system using GPS and one-way cellular-based communication. Also, U.S. Pat. No. 6,043,777 discloses a GPS-based cooperative location system which uses two-way communication in that certain units are receivers and other units are transmitters, but none are both transmitters and receivers (i.e., transceivers).

It is an object of the present invention to provide a method and apparatus utilizing GPS or any other positioning system for locating individuals and a two-way communication system for enhancing safety among outdoor recreationists.

It is another object of the present invention to provide a method and apparatus utilizing GPS or any other positioning system for locating individuals and a two-way communication system for enhancing safety among hunters.

It is an further object of the present invention to provide a method and apparatus utilizing GPS or any other positioning system for locating individuals and a two-way communication system to allow multiple individuals in a party to determine the location of other individuals in their party.

SUMMARY OF THE INVENTION

The invention comprises a compact, portable, electronic device having a wireless transceiver, a GPS receiver, and a processor and a method of using the device. Each device is worn by, or mounted on the firearm of, an individual in a party engaged in an activity in which it is desirable to know the location of the other individuals in the party. Such activities typically would be outdoor activities such as hunting. The two-way communication system may be a peer-to-peer system between the devices (similar to a walkie-talkie system), but preferably is a communication system such as a cellular communication system utilizing base stations as relays between the devices. In accordance with the invention, each individual in the party is provided with one of the devices. Each device determines its location by use of GPS and then transmits that information to the other devices carried by the other individuals in the party. Each device processes the received GPS information as to the location of the other individuals in the party as well as its own location information and provides that information to the user in a useable fashion. For instance, an LCD display may generate a map of the local area and indicate the location on the map of all of the individuals in the party.

In a preferred embodiment of the invention, the device further includes an electronic compass and can be coupled to the firing mechanism of a firearm. When the device detects that the firearm is pointing in the direction of one of the other hunters, it disables the firing mechanism of the firearm. Alternately, the directional information can be combined with a distance calculation so that the device disables the firing mechanism only when both the other hunter is in the direction in which the firearm is pointing and within a predefined distance that would make it unsafe to discharge the firearm in that direction.

DETAILED DESCRIPTION OF THE INVENTION

Figure 1:
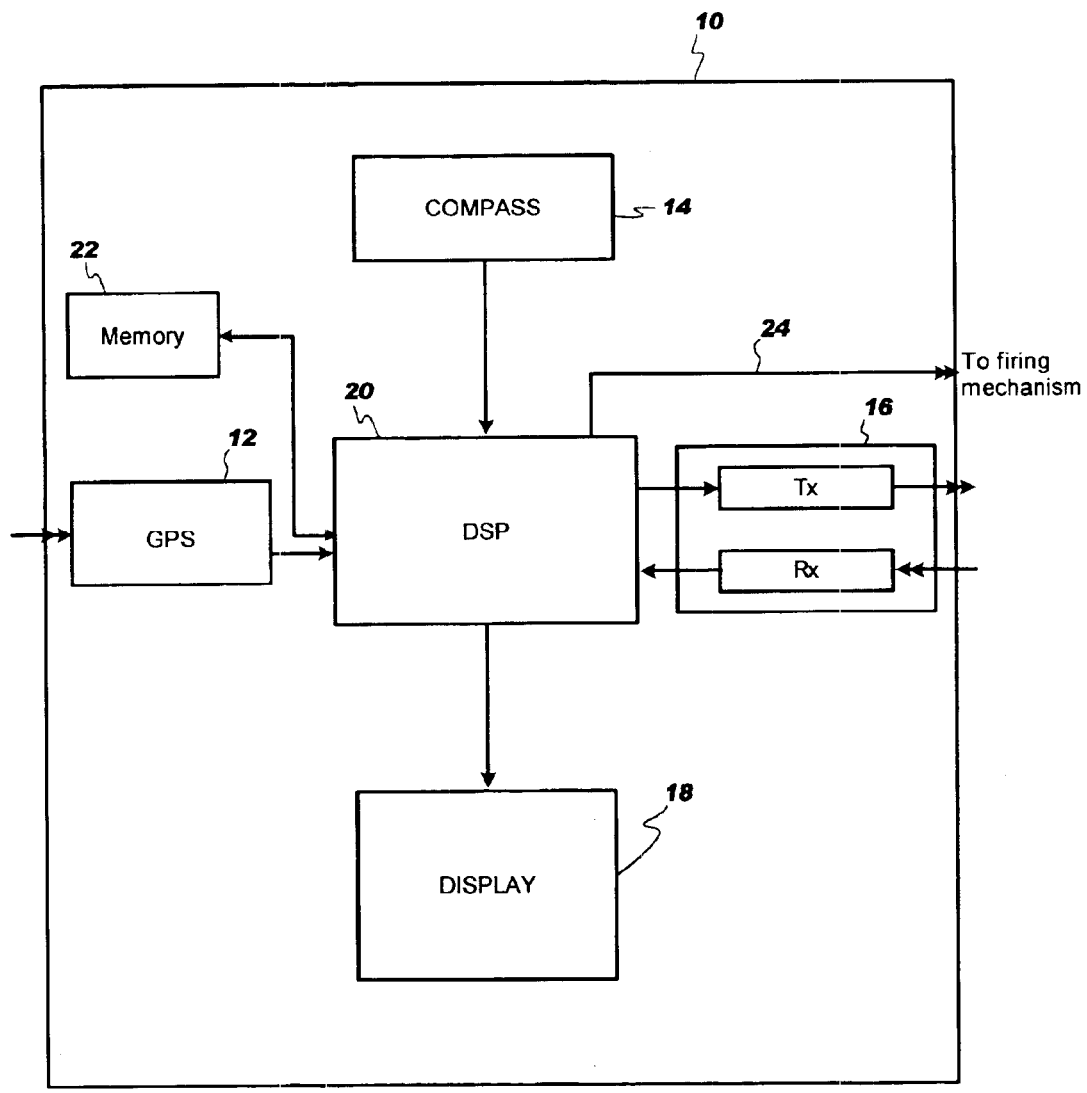
FIG. 1 is a block diagram of a electronic device in accordance with the present invention.

In at least one preferred embodiment, the invention takes the form of a service that a service provider, such as a land owner of a hunting ground, can provide to hunters hunting on a particular piece of property in order to enhance the safety of the hunting environment. The basic concept of the invention is to provide each hunter on the property or otherwise in a designated locale with a portable electronic device that includes a GPS receiver for determining its own location, and a transceiver for transmitting its location to other devices or to a base station, and receiving the locations of other such devices directly from those other devices or from the base station, and then either providing an indication of the location of the devices relative to each other and/or whether it is safe to discharge a firearm in a certain direction or preventing the firearm from discharging in that direction.

In some embodiments, a display such as a liquid crystal display may be incorporated into the device which shows the location of other hunters either textually or graphically such as by generating a map of the local area and indicating the locations of the devices with blinking cursors.

Even further, in a preferred embodiment of the invention, the unit includes an electronic digital compass and can be mechanically or electronically coupled to a firearm so that it can disable the firing mechanism of the firearm when it detects that the firearm is pointing in the direction of another device. In addition, the device might also calculate the distance between itself and any other device based on the location information and combine that information with the compass information and only disable the firing mechanism (and/or otherwise indicate an unsafe condition) if the firearm is pointing in the direction of another device and the other device is within an unsafe distance. Alternately, distance calculations can be performed at the base station and the distance information transmitted to the devices along with the location information.

In embodiments of the invention including a digital compass, the device preferably includes a mechanism for mounting the device to the firearm so that the compass reading can be converted into information as to the direction in which the firearm is pointing. For instance, the device can be provided with a mounting mechanism that causes it to mount to the firearm in a particular orientation thereto so that the orientation of the device is directly convertible to an orientation of the firearm. In one embodiment, the mounting mechanism comprises any reasonable mounting device for mounting to the firearm and a lockable swivel mechanism coupled between the device (or at least the compass portion of the device) and the portion that attaches to the firearm so that the compass can always be rotated to a particular orientation relative to the firearm.

In another embodiment, the device may be provided with an LCD display and an input device such as a keypad and provide a routine by which a user can program the device to determine its orientation relative to the firearm. Instructions for calibrating the compass relative to the firearm can be provided on screen with prompts after each step of the calibration process is performed. The process might comprise initiating a calibration routine by pressing a "CALIBRATE" key. The display might then display an indication of the direction of Earth Magnetic North and prompt the user to point the firearm in that direction and then press the calibrate button again to lock in the calibration.

It also is possible for the device simply to be worn by the user in such a manner that its orientation to the firearm will normally always be the same when the user is holding the firearm in the firing position. For instance, the device can be worn on the user's arm and, more particularly, the wrist, which normally would always be in the same orientation to the firearm when in the firing position.

In another alternate embodiment, the device is built into the firearm and is integral therewith.

The unit includes any reasonable processing means such as a digital signal processor (DSP), a micro processor, an applications specific integrated circuit (ASIC), a programmed general purpose processor, and/or analog circuitry for processing the GPS information indicating the location of the device as well as the location of all of the other devices received by the wireless communication transceiver to determine the location of each other device relative to itself, generating signals to report its own location via the transceiver to the other devices, combining that information with the digital compass output to determine the direction in which the firearm is pointing and issuing a visual or audible warning when the weapon is pointing in the direction of another hunter that is within an unsafe distance.

In an even more preferred embodiment of the invention, the device includes an output terminal for coupling to a mating input terminal of the firing mechanism of the firearm on which a signal is generated when the processor determines that the firearm is pointing toward another hunter that electronically disables the firing mechanism. The DISABLE signal is asserted when the processor detects that the firearm is pointing in the direction of another such device that is within an unsafe distance of the device.

In one preferred embodiment of the invention, all of the devices report their location information to a central base station which collects the reported information from each device and transmits the collected information to each unit.

In at least one preferred embodiment of the invention, the two-way communication system is a cellular telephone communication system. In fact, it need not be a cellular telecommunication system built specifically for use in connection with the present invention, but may simply be any existing, third party, cellular telephone communication system that covers the relevant geographic area.

In other embodiments, however, there need not be a central base station. Instead, each device can communicate with the other devices on a peer-to-peer basis. However, this embodiment is less preferred because it might require higher power transmitters depending on the size of the property which would require larger batteries and/or result in shorter battery life.

In yet a further embodiment, peer-to-peer communication between the devices can be used, but booster antenna towers can be provided in the locale to relay signals between the devices. Further, while the invention has been described in connection with at least two embodiments using radio type wireless communications systems, namely cellular telephones and two-way radios, other forms of wireless communication are possible, such as the Bluetooth system promulgated by Bluetooth SIG, Inc., the specification of which is available on the World Wide Web at www.bluetooth.com and the 802.11 wireless LAN protocol promulgated by the IEEE, both of which have industry-standard specifications which are incorporated herein by reference. Both of these protocols are particularly suitable for use in the present invention in that they are extremely well optimized for battery power conservation. They both have very short duty cycles and the transmitter is placed into a lower power state for the majority of the time slot intervals. With such technologies, in fact, it may be possible for the devices to transmit their locations continuously (e.g., every 20–200 milliseconds). Both Bluetooth and 802.11 can be used with peer-to-peer communications and communications that use one or more base stations as relays. Infrared communications systems also are possible.

While the invention has so far been described in connection with firearms and hunters, it can be used in connection with any other weapon and in connection with any other activity for which it would be useful to know the location of other individuals.

In a preferred embodiment, the user can selectively turn the unit on or off.

The intervals at which each unit transmits its location and/or the intervals at which the central base station transmits the locations of all the units typically can be on the order of about every ten to fifteen seconds. This period is determined based on the likely maximum rate of travel of a hunter on foot and the resolution of the GPS system.

Since the devices likely will be battery powered, it is desirable to minimize power consumption by making the intervals as long as reasonably possible while still providing a reasonable safety margin.

One of the tasks of the devices of the present invention that requires the most power is the wireless transmission of its location to the other devices or to the base station. Thus, one very effective way of minimizing power consumption is, each time the GPS receiver checks its location, to compare that location to the last location it transmitted, and, if it has not moved more than a predefined distance, it does not transmit its location. This distance preferably is approximately the same as the resolution of the GPS system, i.e., twenty to twenty-five feet. This can substantially reduce power consumption and increase battery life since hunters often remain motionless for extended periods of time.

FIG. 1 is a block diagram of an exemplary device 10 in accordance with a preferred embodiment of the present invention. The unit includes a GPS receiver 12, a digital compass 14, a wireless transceiver 16, a DSP 20, and a display device 18, all operatively coupled to provide the functionality set forth in this specification. The device 10 is fixedly mounted to a firearm (not shown) so that the direction determined by the compass is indicative of the direction in which the firearm is pointing.

In operation, the GPS receiver 12 determines the location of the device 10 at predetermined intervals, e.g., every ten to fifteen seconds, and reports that information to the DSP 20. The DSP 20 controls the transceiver to transmit the location information periodically. The transceiver 16 also receives a report from a central base station providing the location of others of the devices at periodic intervals. The digital compass 14 also reports direction to the DSP 20 at periodic intervals. The interval for reporting the compass direction should be much smaller than the other intervals, namely, on the order of several times a second, since an individual can change the direction in which the firearm is pointing very quickly.

The DSP 20 runs the information disclosing the location of all of the devices, including itself, and the compass information through an algorithm to determine whether there are any other devices that have last reported their location in the direction that the weapon is pointing and within an unsafe distance and provides that information to the user through the display 18. In a preferred embodiment of the invention, the device also has an output terminal for coupling to the firing mechanism of the firearm and outputs a signal disabling the firing mechanism when an unsafe condition is detected. In a preferred embodiment, the device disables the weapon when it is painting within some angular range of the exact direction to another device. This angular range should be selected to provide a reasonable safety margin and may be on the order of about (i.e., 2.5°–22.5° to each side of the other device), but preferably about 5°–25°. The angular also range may be dependent upon the distance between the devices.

The display 18 and the manner in which the information is displayed thereon can take many forms. In a simple embodiment, an unsafe condition can be reported by illuminating a red light. Alternately or in addition, an audible warning tone can be sounded in the case of detection of an unsafe condition. In more sophisticated embodiments, the actual position of the other devices also or alternately can be provided through a textual display or a graphical map display on an LCD (liquid crystal diode) screen. Even further, a map can display the direction in which the other units have been moving and or provide a trace of the movement of the other units over a predetermined preceding amount of time, e.g., five minutes and/or the times of the last received reports of their locations. This would assist users in providing them with a predictor of the likely direction in which the other individuals are moving since the last report.

An embodiment of the invention utilizing peer-to-peer two-way communication can be implemented simply by two or more individuals using the devices as described herein. In a base-station type embodiment, a third party service provider can provide a purpose-built communication base-station comprising a radio or other wireless communication antenna tower, a transceiver, and the necessary digital processing equipment to receive the location information from all of the devices in the area, process it, and transmit it back out to the devices as previously described. The service provider can rent the devices to hunters in a given locale, which may comprise a privately owned parcel of land owned or operated by the service provider.

Figure 2:
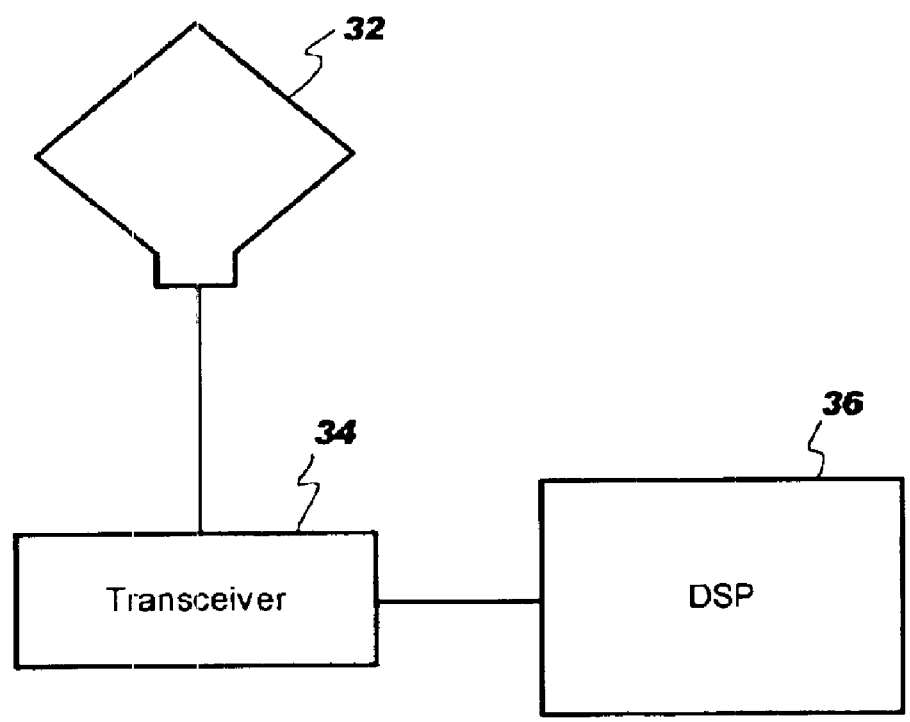
FIG. 2 is a block diagram of a base station in accordance with the present invention.

FIG. 2 is a block diagram of the basic components of the base station. It comprises a communication antenna 32, a transceiver 34 for receiving individual location reports of the devices and transmitting the collected location information report back out to all of the devices in the area, and a processing unit, such as DSP 36, for processing the received individual location reports and organizing the location information into a report to be transmitted back out to all of the devices.

In other embodiments, the service provider need not operate the base station(s), but may use existing cellular telephone or other wireless communication systems. In this type of embodiment, the service provider merely maintains the central digital processing equipment and maintains one or more telephone numbers (or other unique wireless network identification codes) that the devices dial into (or otherwise accesses) using the third party communication system to access the central digital processing equipment and vice versa.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of providing enhanced safety among a plurality of hunters hunting in a particular locale, said method comprising the steps of:
   (1) providing a wireless communication system covering said locale; and
   (2) providing each hunter with an electronic device adapted to determine its location and orientation, transmit its location information through said wireless communication system, receive location information of said other of said devices in said locale, determine the location of the other of said devices in said locale relative to its own location and orientation, and generate a warning signal responsive to determination that another of said devices is in a certain direction relative to said orientation of said device.

2. The method of claim 1 wherein step (2) comprises indicating said unsafe condition only if said other device also is within a certain distance of said device.

3. The method of claim 2 wherein step (2) comprises providing each device with an electronic compass to determine said orientation of said device, said device adapted to combine said orientation information and said location information to determine the distance and direction of said other devices relative to said device.

4. The method of claim 3 further comprising the step of:
   (3) providing a mechanism for mounting said device to said hunter's firearm such that said compass indicates the direction in which said firearm is pointing.

5. The method of claim 3 wherein step (1) comprises providing a peer-to-peer wireless transceiver in each said device.

6. The method of claim 3 wherein step (1) comprises the steps of:
   (1.1) providing a central processing device remote from said electronic devices;
   (1.2) wirelessly receiving at said central processing device said location information transmitted by said devices in said locale;
   (1.3) processing at said central processing device said location information of said devices to generate a report of the location of all of said devices in said locale; and
   (1.4) wirelessly transmitting said report from said central processing device to said devices in said locale.

7. The method of claim 6 further comprising the step of:
   (1.5) providing at least one communication base station comprising an antenna and a transceiver for transferring said location data and said report between said devices and said central processing device.

8. The method of claim 6 further comprising the steps of:
   (1.6) utilizing a third party wireless communication system for transferring said location data and said report between said devices and said central processing device.

9. The method of claim 6 further comprising the step of:
   (4) providing a hunting round within which said devices can operate.

10. An apparatus for providing enhanced safety among a plurality of hunters hunting in a particular locale, said apparatus comprising:
    an electronic device adapted to determine its location and generate a location signal;
    a compass for determining an orientation of said apparatus;
    a wireless transmitter for transmitting said location signal;
    a wireless receiver for receiving location information of said other of said apparatuses; and
    a processing device adapted to determine the location of the other of said apparatuses relative to said apparatus and generate a warning signal responsive to determination that another of said devices is within a certain distance and in a certain direction relative to said orientation of said apparatus.

11. The apparatus of claim 10 wherein said processing device combines said orientation and said location information to determine the distance and direction of said other devices relative to said device.

12. The apparatus of claim 11 further comprising:
    a mechanism for mounting said device to a firearm such that said compass indicates the direction in which said firearm is pointing.

13. The apparatus of claim 10 wherein said electronic device adapted to determine location comprises a Global Positioning Satellite receiver.

14. The apparatus of claim 10 wherein said wireless transmitter and said wireless receiver are adapted to communicate with others of said apparatus on a peer-to-peer basis.

15. The apparatus of claim 10 wherein said wireless transmitter and said wireless receiver are adapted to communicate with a base station.

16. The apparatus of claim 10 further comprising a warning device for indicating said unsafe condition.

17. The apparatus of claim 16 wherein said warning device is an audio device for generating an audible signal.

18. The apparatus of claim 16 wherein said warning device is a display device for generating a visual signal.

19. The apparatus of claim 18 wherein said display device is an LCD display screen.

20. The apparatus of claim 19 wherein said display device comprises at least one light that is illuminated when an unsafe condition is detected.

21. The apparatus of claim 10 further comprising a signal output line for coupling to control a firing mechanism of a firearm and wherein said processing device further asserts a signal on said signal output line that disables said firing mechanism when said unsafe condition exists.

22. The apparatus of claim 10 wherein said processing device causes said transmitter to transmit said location information only if said apparatus has moved more than a predetermined distance since the last time the apparatus transmitted its location information.

* * * * *